United States Patent Office.

RUSSELL S. PENNIMAN, OF DOVER, NEW JERSEY, ASSIGNOR TO THE ATLANTIC DYNAMITE COMPANY, THE REPANNO CHEMICAL COMPANY, AND THE HERCULES POWDER COMPANY.

EXPLOSIVE COMPOUND.

SPECIFICATION forming part of Letters Patent No. 333,152, dated December 29, 1885.

Application filed March 3, 1885. Serial No. 157,661. (No specimens.)

*To all whom it may concern:*

Be it known that I, RUSSELL S. PENNIMAN, of Dover, in the county of Morris and State of New Jersey, have invented an Improved Explosive Compound; and I do hereby declare that the following specification is a clear, true, and complete description of my invention.

My said compound contains chlorate of potash and nitrate of ammonia, and the latter in its best form is protected in accordance with the invention disclosed by me and claimed in my Letters Patent dated February 10, 1885, No. 312,010.

In a certain application for Letters Patent filed by me May 3, 1883, Serial No. 93,751, I describe and claim an explosive compound composed of chlorate of potash and protected nitrate of ammonia, and said compound is highly effective and in all ways desirable if its compounding, storage, transportation, and use be carried on during seasons of low temperature; but I find there is a tendency to spontaneous combustion on the part of the potash element if, after compounding, it is long exposed to temperatures above, say, 80° Fahrenheit. For obviating this tendency I have found it desirable to keep the chlorate and nitrate separately, and to put them up in such form that the best proportions can be accurately determined without the trouble of weighing or measuring whenever the compound is required for immediate use. In thus proceeding I find that, although chlorate of potash is not generally classed among the hygroscopic salts, it is nevertheless specially liable to cake and harden, so that when needed for use more or less trouble is involved in again reducing it to the finely-divided condition requisite for obtaining proper results.

The object of my present invention is to obviate these objections, and I do this by mixing with the dry and finely-divided chlorate of potash a sufficient quantity of such dry finely-powdered material as will, by adhering to or being interposed between the particles of chlorate, render them practically incapable of consolidating under ordinary conditions of exposure to the atmosphere. I prefer that said material be inert—as, for instance, carbonate of magnesia or chalk or infusorial earth—although good results will accrue from the use of such bodies as dextrine, starch, or wood pulp, the important characteristics of such material being that it must be capable of being thoroughly dried, finely powdered, and incapable of solidifying under ordinary circumstances. Of the several materials mentioned, I know of none better suited for my purposes than carbonate of magnesia.

In preparing the chlorate of potash for use in my compound it is first thoroughly dried while in a finely-divided condition, and then mixed with, say, from two to five per cent. of its weight of finely-powdered and thoroughly-dried carbonate of magnesia until the latter is well distributed throughout the mass and the particles of chlorate are surrounded therewith as far as may be practicable, and thereby separated from each other and rendered incapable of solidifying or "caking." In producing the explosive for storage or transportation I keep the thus-prepared chlorate and the protected nitrate of ammonia in separate packages and properly proportioned, so that the contents of any two packages may be readily combined or mixed without need of appliances for weighing or measuring.

The proportion of carbonate of magnesia or its equivalent to the chlorate may be somewhat varied without materially affecting the results desired; but any excess of the carbonate or its equivalent above what is actually required to render the grains or particles of chlorate incapable of caking, consolidating, or solidifying in mass would be a more or less objectionable or useless surplusage in the compound.

For obtaining the best results I employ with thirteen and one-half parts of the protected nitrate of ammonia eleven and one-half parts of the combined chlorate of potash and magnesia; but these proportions do not enter into the gist of my invention; nor is it an essential part thereof that the nitrate of ammonia be protected with the soft educts or products of petroleum, as set forth in my aforesaid Letters Patent and application, because, while that particular protecting medium is, as I believe, best suited for my purposes, it is immaterial in what maner or by what material said nitrate is protected, provided it be properly guarded against deliquescence, and also provided that it is enabled to maintain its divided or granulated condition, so as to be readily and conveniently mixed with the prepared chlorate of potash.

It is sometimes desirable to sensitize my explosive compound, and this I do by the use of powdered sulphur mixed with the protected nitrate of ammonia—as, for instance, five parts of sulphur with forty nine parts of the protected nitrate—and then to this mixture I add forty-six parts of the combined chlorate of potash and carbonate of magnesia.

The proportions herein stated may be largely varied; but I deem it advisable that the protected nitrate, with or without the sulphur, should never be less than about one-third in weight of the whole compound.

Having thus described my invention, I claim as new and desire to secure by Letters Patent—

The explosive compound, substantially as hereinbefore described, composed of grains or particles of nitrate of ammonia coated or protected against deliquescence, and grains or particles of chlorate of potash rendered incapable of caking or solidifying in mass by means of a dry powdered material—such as carbonate of magnesia—as and for the purposes specified.

RUSSELL S. PENNIMAN.

Witnesses:
CHARLES H. MUNSON,
JAMES H. NEIGHBOUR.